July 23, 1929.  S. K. DENNIS  1,721,691
MANURE SPREADER DRIVING MECHANISM
Filed Sept. 28, 1923
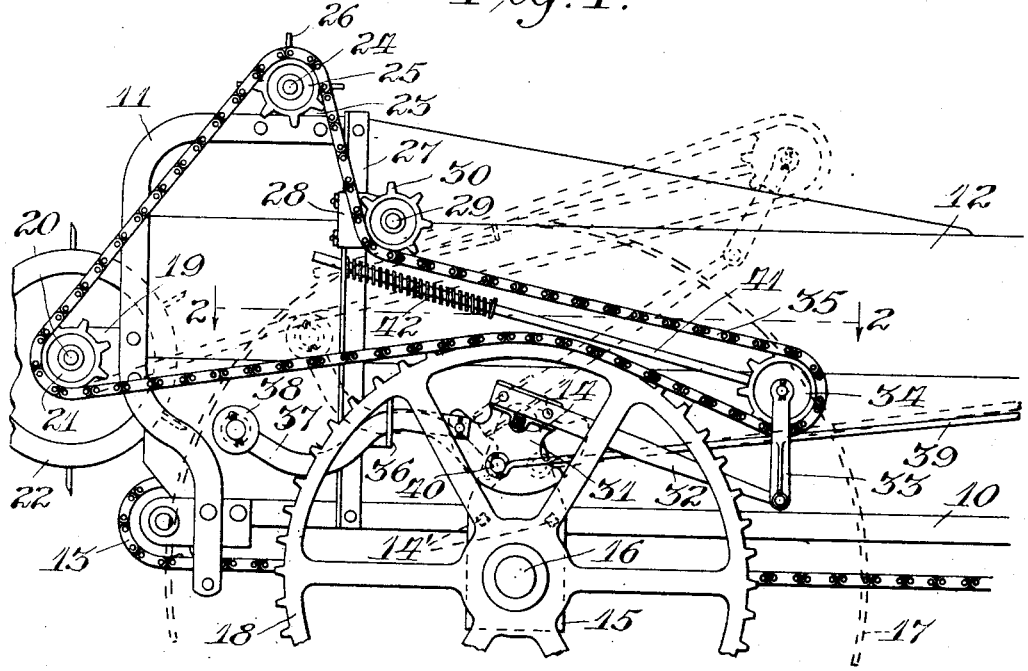
Inventor:
Samuel K. Dennis,
By H.P. Doolittle
Atty.

Patented July 23, 1929.

1,721,691

UNITED STATES PATENT OFFICE.

SAMUEL K. DENNIS, OF CHICAGO, ILLINOIS, ASSIGNOR TO INTERNATIONAL HARVESTER COMPANY, OF CHICAGO, ILLINOIS, A CORPORATION OF NEW JERSEY.

MANURE-SPREADER-DRIVING MECHANISM.

Application filed September 28, 1923. Serial No. 665,501.

The present invention appertains to a driving mechanism and is especially adapted for machines such as manure spreaders, wherein a source of power is connected to and disconnected from the driven elements of the machine.

In manure spreaders of the type I have chosen to illustrate, the rear axle carries a large sprocket wheel, and mounted on the side of the spreader body above this sprocket wheel, is an endless sprocket chain operatively connected to certain moving parts of the machine to impart rotation thereto. This endless chain derives its motion from the sprocket wheel mentioned by being dropped into mesh therewith.

Under practical conditions of operation, it frequently happens that due to a loosening of parts and allied reasons the endless driven chain will not aline and properly mesh with the sprocket wheel when it is moved into driving position.

The principal object of my invention, therefore, is to provide improved means for connecting and disconnecting the source of power, such as the sprocket wheel mentioned, to the driven parts of the machine.

Another object is to provide means which is reliable and dependable in operation and which will assure proper alinement of the driving and driven parts.

I accomplish these objects by providing means controlled by the operator of the machine which will support the chain and guide it from inoperative to operative position.

In the accompanying drawings, I have illustrated one embodiment which my invention may assume in practice, and in these drawings,—

Fig. 1 is a side elevational view of the rear end of a manure spreader and the driving and driven parts in association therewith;

Fig. 2 is a plan view taken approximately along the line 2—2 of Fig. 1 looking in the direction of the arrows; and Fig. 3 is a detail sectional view taken along the line 3—3 of Fig. 2 looking in the direction of the arrows.

For purposes of illustration, I have shown my improved driving mechanism associated with a conventional manure spreader having side frame channels 10, only one of which is shown, and end arched frame channels 11 supporting the side boards 12 of the spreader body. The usual conveyor apron 13 is shown and moves over the floor of the spreader body in the usual way. Bolted to one of the side boards 12 by means of bolts 14 and 14' are depending apertured brackets 15, only one being shown, in which is rotatably mounted a rear axle or drive shaft 16 to which are keyed, or otherwise fixed, the traction wheels 17. Keyed to the drive shaft 16 between the side of the spreader body and the traction wheel 17 is an enlarged driving sprocket 18 which is adapted to impart rotation to the movable parts of the manure spreader, as will be hereinafter described. Brackets 19 are bolted to the rear arch supports 11 and in these brackets is rotatably mounted a shaft 20 carrying a sprocket wheel 21 and main disintegrating beater 22. Fixed to the arched support 11 above and forwardly of this main beater 22 are brackets 23 which rotatably support a shaft 24 carrying a sprocket wheel 25 and an auxiliary or supplemental beater 26. Bolted to the side boards 12 of the spreader body and the frame member 10 between the axle or drive shaft and the rear end of the machine is an upright standard or frame member 27 to which is adjustably bolted a bearing bracket 28 carrying an idler shaft 29, and idler sprocket 30.

Oscillatably carried on the bracket 15 by means of the extended bolt 14 is a plate 31 to which is bolted above the pivotal connection 14, an outwardly extending arm 32. This arm 32 has pivoted to its outermost end another arm 33 which extends upwardly, and rotatably carries a sprocket wheel 34.

Trained around this sprocket wheel 34 and the sprocket wheels 21, 25 and idler 30, heretofore mentioned, is the driving sprocket chain 35, which is adapted to be brought into driving engagement to rotate the main and supplemental beaters by dropping the same over the periphery of the enlarged driving sprocket 18. The adjustable bracket 28 and idler sprocket carried thereby, above mentioned, may be utilized in taking slack out of this driving sprocket chain, as is well understood.

As mentioned in the objects of this invention, difficulty has been experienced in properly meshing this drive chain with the drive sprocket when moving it downwardly. To overcome this difficulty, I have provided a bracket 36 bolted adjacent the oscillating plate 31 to one of the side boards 12 of the spreader body. Pivoted to the plate 31 is a reversely bent arm 37, which extends outwardly and slidably through the bracket 36 and away from the arm 32 heretofore mentioned. Rotatably mounted at the distal end of the arm 37 is a roller 38. The plate 31 is adapted to be oscillated or rocked by means of a link 39 pivoted to the plate 31, as shown at 40, and extending forwardly to a position adjacent the driver's seat, not shown, where it may be operated by any suitable lever mechanism, not shown.

From the above detailed description, it will be obvious that, as the plate is rocked to one side or the other of its pivot 14 by means of the link 39, the arms 32 and 37 will be made to raise or lower the chain out of or into engagement with the sprocket wheel 18, whereby rotation will be imparted to the operative parts of the machine. I have shown in dotted lines in Fig. 1 the position which this mechanism will assume when the chain is raised out of driving engagement, the lever 32 having been moved upwardly to raise the right end of the drive chain and the arm 37 having slid through the bracket 36 to raise the left end of the chain. When the plate 31 is rocked in an opposite direction, the reverse movement, of course, takes place and, as the sprocket 34 operable by the arm 32 is in constant mesh with the chain, the right end of the chain will be guided over the sprocket 18 and the reversely bent arm 37 will slide in an opposite direction through the bracket 36 and guide the left end of the chain into position on the sprocket.

If desired, a suitable toggle link 41 may be loosely pivoted in the upstanding support 27 and connected to the pivot of the sprocket 34 for maintaining the proper tension on the sprocket chain 35 by means of a coil spring 42. This spring pressed toggle link will also assist in holding the chain to duty in its lowered position and holding it out of position when raised.

From the above disclosure, it will be apparent that I have provided a device which will accurately lower the drive chain into position to make driving engagement, and one that will not readily get out of alinement, due to the bracket 36 above described.

While I have in the above specification described one embodiment which my invention may assume in practice, it is to be understood that the invention is capable of modification and that such modifications may be employed without departing from the spirit and scope of the invention as described in the appended claims.

What I claim is:

1. In a driving mechanism, a drive shaft, a driving sprocket mounted on said drive shaft, an endless drive chain operatively positioned with respect to said sprocket, an oscillatory plate mounted above said drive shaft, a toggle link operable by said plate for raising and lowering one end of said chain, and a curved arm simultaneously operable by said plate for raising and lowering the other end of said chain out of and into operative engagement with said sprocket.

2. In a driving mechanism, a drive shaft, a driving sprocket mounted on said drive shaft, an endless drive chain operatively positioned with respect to said sprocket, an oscillatory member mounted above said drive shaft, and a pair of oppositely extending arms connected to said member, one of said arms being curved and supported intermediately of its ends for sliding movement in a guide member, and means on each of the arms for engaging the endless chain to connect and disconnect it from the driving sprocket.

3. In a driving mechanism, a drive shaft, a driving sprocket mounted on said drive shaft, a drive chain operatively positioned with respect to said sprocket, a rockable plate, a bracket fixed adjacent said plate, and means including a reversely bent lever operable by said plate and slidable in said bracket for guiding said chain into and out of engagement with said driving sprocket.

4. In a driving mechanism, a drive shaft, a driving sprocket mounted on said drive shaft, a drive chain operatively positioned with respect to said sprocket, an oscillatory member, a bracket fixed adjacent said oscillatory member, and a pair of oppositely extending chain engaging members connected to and operable by said oscillatory member, one of said members being slidable in said bracket.

5. In a driving mechanism, a drive shaft, a driving sprocket mounted on said drive shaft, a drive chain operatively positioned with respect to said sprocket, an oscillatory member, a bracket fixed adjacent said oscillatory member, and a pair of oppositely extending chain engaging arms connected to and operable by said oscillatory member, one of said arms being reversely bent and operable in said bracket.

In testimony whereof I affix my signature.

SAMUEL K. DENNIS.